(12) United States Patent
Capens

(10) Patent No.: US 9,483,843 B2
(45) Date of Patent: Nov. 1, 2016

(54) METHOD AND SYSTEM FOR EXPEDITING BILINEAR FILTERING

(71) Applicant: Transgaming Inc., Toronto (CA)

(72) Inventor: Nicolas Capens, Montreal (CA)

(73) Assignee: Transgaming Inc., Toronto (CA)

(*) Notice: Subject to any disclaimer, the term of this patent is extended or adjusted under 35 U.S.C. 154(b) by 318 days.

(21) Appl. No.: 14/153,659

(22) Filed: Jan. 13, 2014

(65) Prior Publication Data

US 2015/0199825 A1 Jul. 16, 2015

(51) Int. Cl.
*G09G 5/00* (2006.01)
*G06T 7/40* (2006.01)
*G06T 15/04* (2011.01)
*G06T 1/60* (2006.01)

(52) U.S. Cl.
CPC .............. *G06T 7/403* (2013.01); *G06T 1/60* (2013.01); *G06T 15/04* (2013.01); *G06T 2207/20024* (2013.01)

(58) Field of Classification Search
None
See application file for complete search history.

(56) References Cited

U.S. PATENT DOCUMENTS

| | | | |
|---|---|---|---|
| 5,486,876 A | 1/1996 | Lew et al. | |
| 5,767,858 A | 6/1998 | Kawase et al. | |
| 5,815,157 A | 9/1998 | Bowen | |
| 6,011,565 A | 1/2000 | Kuo et al. | |
| 6,184,893 B1 | 2/2001 | Devic et al. | |
| 6,768,492 B2 | 7/2004 | Dorbie et al. | |
| 6,819,324 B2 | 11/2004 | Emberling | |
| 7,116,335 B2 | 10/2006 | Pearce et al. | |
| 7,136,071 B1 | 11/2006 | Donovan et al. | |
| 7,409,109 B2 | 8/2008 | Jeffrey | |
| 7,580,042 B2* | 8/2009 | Chung | G06T 15/04 345/552 |
| 7,605,822 B1 | 10/2009 | Kugler | |
| 7,663,639 B2 | 2/2010 | Cohen et al. | |
| 7,825,937 B1* | 11/2010 | Sakhartchouk | G06T 15/503 345/426 |
| 8,212,835 B1 | 7/2012 | Migdal | |
| 2003/0138152 A1 | 7/2003 | Fenney | |
| 2003/0218614 A1 | 11/2003 | Lavelle et al. | |
| 2005/0024378 A1* | 2/2005 | Pearce | G06T 15/04 345/587 |
| 2007/0211070 A1 | 9/2007 | Stenson | |
| 2014/0333621 A1* | 11/2014 | Hillesland | G06T 15/04 345/423 |

OTHER PUBLICATIONS

Engel, "GPU Pro 4: Advanced Rendering Techniques", CRC Press, pp. 1-382, Apr. 26, 2013 *section: II Rendering : Hilleslan, "2 Real-Time Ptex and Vector displacement", pp. 69-80.
International Search Report PCT/CA2014/000917 (Mar. 19, 2015).

(Continued)

*Primary Examiner* — Kee M Tung
*Assistant Examiner* — Frank Chen
(74) *Attorney, Agent, or Firm* — Benoit & Cote, Inc.

(57) ABSTRACT

The present document describes a method and system for expediting bilinear filtering of textures, by reducing the number of data load operations. The method expands the original data layout with additional borders containing replicated texels. The replicated texels correspond either to wrapped-around texels for two-dimensional textures or neighboring faces in cube textures. Therefore, a 2×2 filter kernel for bilinear filtering is built which requires only one texel address to be computed, with all texel data readable with two load operations which are a predetermined stride apart. Different addressing modes are implemented by adjusting the sampling locus.

16 Claims, 8 Drawing Sheets

(56) References Cited

OTHER PUBLICATIONS

Kim et al, "A Space-efficient and Hardware-friendly implementiona of Ptex", SIGGRAPH Asia 2011, pp. 1-2, Dec. 12-15, 2011.

ShaderX3: Advanced Rendering with DirectX and OpenGL ; edited by Wolfgang Engel ;p. 166; USA ; 2004.

* cited by examiner

METHOD AND SYSTEM FOR EXPEDITING BILINEAR FILTERING

BACKGROUND (a) Field

The subject matter disclosed generally relates to computer image rendering. More particularly, the subject matter relates to bilinear filtering.

(b) Related Prior Art

Texture sampling and filtering is a fundamental operation in two-dimensional (2D) and three-dimensional (3D) image rendering. Texture sampling generally consists of reading texture element data (aka texels) from an array (texture) around given sampling coordinates, and filtering it for a smooth appearance.

Typically the texture represents a two-dimensional color image which is mapped onto a 3D object, but there are also applications for non-color data, one-dimensional texture arrays, three-dimensional texture arrays, and six 2D textures arranged into a cube layout.

A common method for performing two-dimensional texture filtering is bilinear filtering. Other well-known techniques include trilinear and anisotropic filtering which use bilinear filtering as a building block to further enhance the filtering quality. One-dimensional, three-dimensional and cube texture filtering are straightforward variations of this method.

It is often required to sample the texture with coordinates that are outside of the texture's dimensions. These so-called addressing modes commonly include wrapping around (or 'repeating' the texture), clamping, mirroring once, and mirroring indefinitely. Note that a typical implementation with bilinear filtering requires these addressing modes to be applied to the texels individually to avoid reading outside of the texture data array. Therefore two neighboring texels in the filter kernel are not necessarily neighboring each other in the texture. Therefore they are adjusted to lie within the texture according to at least one given rule.

FIG. 1 illustrates an example of a conventional layout of a two-dimensional texture data in memory. As shown in the layout 100, texels are stored consecutively and at the end of each row (for row-major textures) there can be a padding zone P. The first texel of the next row is stored in the next memory location after the padding zone. Memory uses linear addresses and is thus one-dimensional, but in this illustration each new row is depicted below the previous one to visualize how a two-dimensional texture can be laid out in linear memory. The data size of a row of texels, plus any padding at the end, is the stride value that is the difference between the memory addresses of a texel below another texel.

In conventional methods, when the coordinate of a given sampling point S are adjacent to the border of the data layout as exemplified in FIG. 1, texel data has to be read from the opposite side of the layout to avoid reading non-texel data. For example, as shown in FIG. 1 the sampling point S is in the column (p) on the right edge of the layout, however, in order avoid sampling non-texel data from the padding zone, texel data is sampled from the opposite edge e.g. column (a). This requires a separate memory load operation for each texel to be read. This method is otherwise known as the 'wrapping' addressing mode. Implementations using this data layout have to perform extra work to apply the addressing mode to each texel and read each texel individually.

For cube textures, modern 3D graphics APIs also expect that when sampling a location which would result in reading texels for the filter kernel outside of the two-dimensional array of one cube face, the closest texels from the neighboring cube face are read instead. This also results in neighboring texels of the filter kernel not necessarily neighboring each other in the logical texture layout, and thus, requiring additional computing time and memory load operations.

Therefore, there is a need for a system and method which reduce the computation time of bilinear filtering.

SUMMARY

The embodiments provide a layout for texture data which ensures that all texels for bilinear filtering are located in logically neighboring locations, independent of their addressing mode. It is therefore faster to read those texels than with conventional methods which require the addressing mode to be applied to each filter kernel texel location individually.

The ordinary memory layout for a two-dimensional texture is to store rows of texels consecutively (row-major). Fixed-size gaps between texels and/or rows of texels may exist for alignment reasons. Neighboring texels in the horizontal or vertical direction can thus be addressed by adding or subtracting a predetermined pitch or stride. As known in the art, storing columns of texels consecutively (column-major) results in an alternative memory layout that is logically equivalent if the texture coordinates are swapped. Likewise the order of the rows or columns can be reversed so the first texel in memory may correspond to any corner of the texture. Graphics systems will typically adhere to one convention. In the following, the description is provided with respect to a row-major texel order, with the first texel corresponding to the top-left texture corner, but the embodiments may also be applied to other layout conventions.

In one aspect, there is provided a computing system for expediting bilinear texture sampling of texture layouts comprising principal data including one or more rows and one or more columns of texels, the system comprising: a memory; a processing unit operably connected to the memory, the processing unit being adapted to: receive sampling instructions identifying a first texture layout to sample from and a sampling point having coordinates near an edge of the principal data of the first texture layout; modify the first texture layout, including adding at least one row or column of texels to a given edge of the principal data of the first texture layout, thereby creating a second texture layout; set the closest four texels to the sampling point in the second texture layout as a filter kernel, wherein the four texels include two texels from the added row or column, and wherein two texels of the filter kernel are a stride apart from the remaining two texels; sample the texels of the filter kernel using only two logical load operations; and perform bilinear filtering on the sampled data of the four texels.

While it is possible to implement the embodiments by allocating new memory for the added rows and columns, it should also be noted that the embodiments may also be implemented using a logical operation to avoid the use of additional memory. In a non-limiting example of implementation, the second texture layout may be created in place whereby the additional rows/columns may be added without requiring additional memory. For example, the first texture layout may be allocated with sufficient padding for the borders of the second layout to be contained within the padding, and the principal texture data to overlap. In the present embodiment, it is unnecessary to allocate additional memory to obtain the second layout, and no copying of principal texture data is required other than to fill the border texels.

In an embodiment, the first texture layout is a two-dimensional image layout.

In another embodiment, the added row or column includes duplicate texels from an opposite edge of the principal data.

In another embodiment the first texture layout is a cube face layout of a cube texture.

In a further embodiment, the added row or column includes duplicate texels of an adjacent row or column of an adjacent cube face of the cube texture.

In yet a further embodiment the system is adapted to add rows or columns including texels of different mipmap levels for making the stride a power of two.

In another aspect there is provided, a computer implemented method for expediting bilinear texture sampling of two-dimensional texture layouts comprising principal data including one or more rows and one or more columns of texels, said method comprising: receiving sampling instructions identifying a first texture layout to sample from and a sampling point having coordinates near an edge of the principal data of the first texture layout; modifying the first texture layout, the modifying comprising adding at least one row or column of texels to a given edge of the principal data of the first texture layout, thereby creating a second texture layout; setting the closest four texels to the sampling point in the second texture layout as a filter kernel, wherein the four texels include two texels from the added row or column, and wherein two texels of the filter kernel are a stride apart from the remaining two texels; sampling the texels of the filter kernel using only two logical load operations; and sending the sampled data for bilinear filtering.

In an embodiment, the modifying comprises filling the added row or column with duplicate texels of an opposite edge of the principal data.

In another embodiment the modifying comprises filling the added row or column with texels of different mipmap levels.

In a further embodiment the modifying further comprises making the stride a power of two.

In yet a further embodiment, the method further comprises implementing a gatekeeper for updating the texels in the added row or column when texels of principal data change.

In yet another embodiment, the method further comprises issuing pre-fetch instructions for locations around the filter kernel to reduce an effect of a larger stride on a processor's cache performance.

In another aspect, there is provided a computer implemented method for expediting bilinear texture sampling of cube textures comprising adjacent cube faces, each cube face having a texture layout including principal data comprising one or more rows and one or more columns of texels, said method comprising: receiving sampling instructions identifying a first cube face of a given cube texture to sample from and a sampling point having coordinates near an edge of the principal data of a first texture layout corresponding to the first cube face; modifying the first texture layout, the modifying comprising adding at least one row or column of texels to a given edge of the principal data of the first texture layout, thereby creating a second texture layout; setting the closest four texels to the sampling point in the second texture layout as a filter kernel, wherein the four texels include two texels from the added row or column, and wherein two texels of the filter kernel are a stride apart from the remaining two texels; sampling the texels of the filter kernel using only two logical load operations; and sending the sampled data for bilinear filtering.

In an embodiment, the modifying comprises filling the added row or column with duplicate texels of an adjacent row or column of an adjacent cube face.

In another embodiment, modifying the first texture layout comprises adding an entire texture layout of a neighboring cube face to a corresponding edge of the first texture layout.

In yet an embodiment, the modifying comprises adding one row and one column of texels to the principal data, and setting a corresponding corner texel between the added row and added column as an average value of corner texels of principal data of neighboring cub faces.

In a further embodiment, the method further comprises implementing a gatekeeper for updating the texels in the added row or column when texels of principal data change.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

DETAILED DESCRIPTION

The present document describes a method and system for expediting bilinear filtering of textures, by reducing the number of data load operations. The method expands the original data layout with additional borders containing replicated texels. The replicated texels correspond either to texels of opposite edges for two-dimensional textures or neighboring faces in cube textures. Therefore, a 2×2 filter kernel for bilinear filtering is built which requires only one texel address to be computed, with all texel data being readable with two load operations which are a predetermined stride apart. Different addressing modes are implemented by adjusting the sampling locus.

In a non-limiting exemplary implementation of the present embodiments, one or more columns and/or rows of texels are added to the outer edges of the texture layout to replicate the texel data of the opposing edge. An example is shown in FIG. 2.

Figure 1:
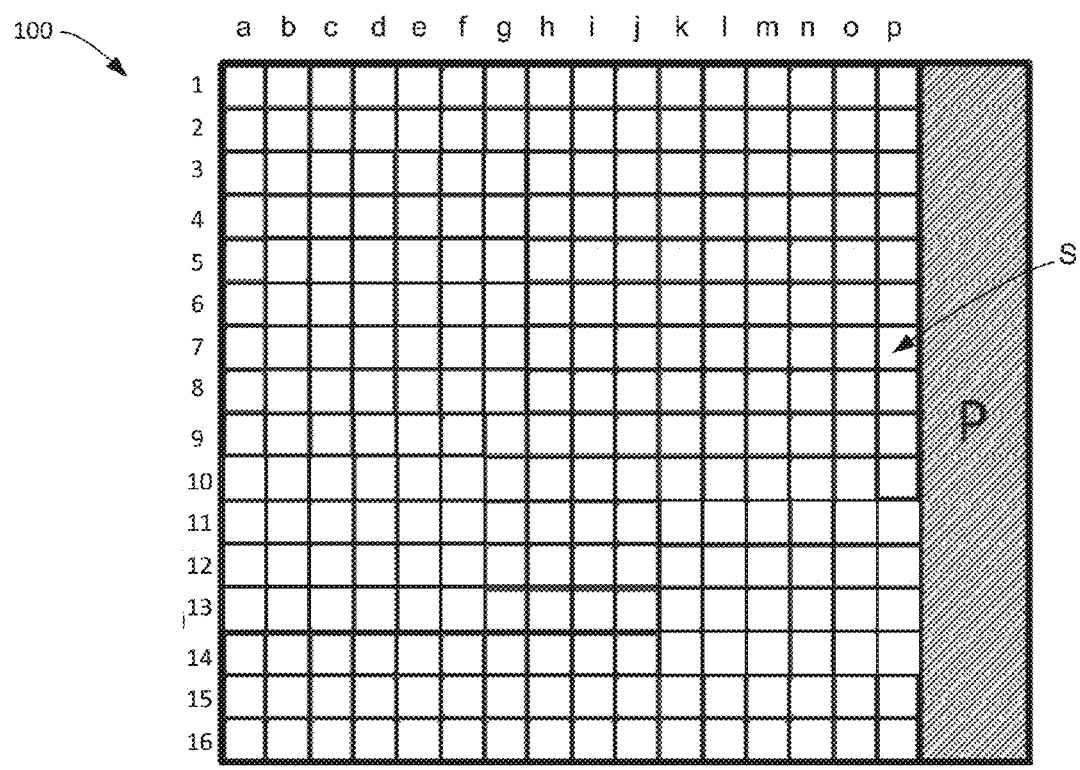
FIG. 1 illustrates an example of a conventional layout of a two-dimensional texture data in memory.
Figure 2:
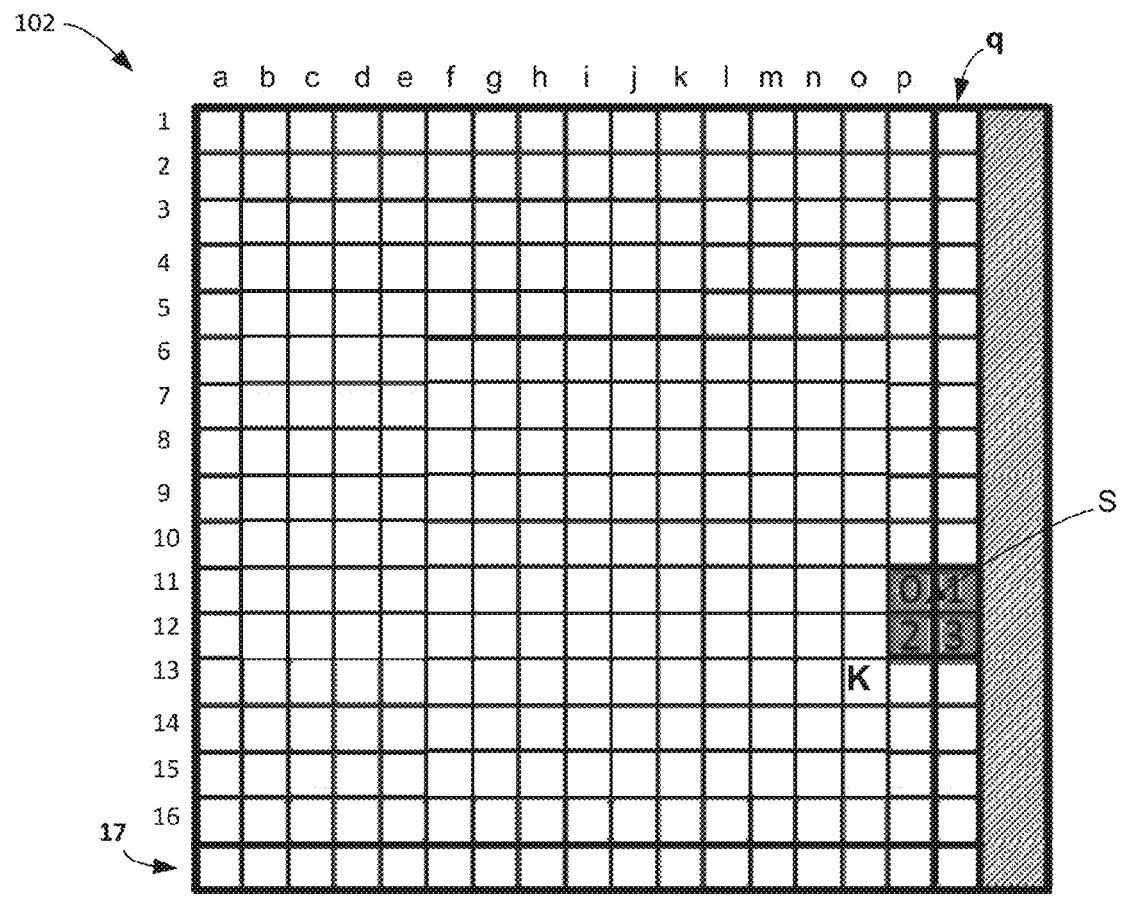
FIG. 2 illustrates an exemplary layout of texture data including added border texels in accordance with an embodiment

FIG. 2 illustrates an exemplary layout of texture data including added border texels in accordance with an embodiment. In the layout 102 an additional column q is added after p (as compared to layout 100 in FIG. 1) which mirrors the texels in the opposite column a. Similarly, an additional row 17 is added which mirrors the texels in row 1. Using the present embodiment, when the coordinates of a sampling point S are near the edge of the texture layout, a filter kernel K is set which includes the four closest texels to the sampling point S. In the present case, the four closest texels includes two texels from the column p and two texels from the column q which includes duplicate texels of column a. Bilinear filtering is then applied to the filter kernel K as described below with respect to FIG. 3.

The system may be configured to manage the allocation of the border q and update the data in this column automatically when the principal data is changed e.g. when a new image is loaded.

In an embodiment, singular texels are added where the new row(s) and column(s) meet, which replicate the texel data of the opposing texture corner. In the present document, the new texels added at the edge are called the 'border' of the texture, while the original texels constitute the 'principal' texture data. The texture border is not directly addressable through texture sampling. Instead, the 2×2 texel kernel for bilinear filtering can read these texels in cases where the kernel would otherwise have to be split up to read the texels of opposing edges. In other words, no sampling point will be received having coordinates that fall in the border columns q since the border texels in column q are not part of the principal data. This layout with borders of replicated texels therefore lends itself naturally for the wrapping addressing mode.

One of the advantages of this configuration is that the two texels on the same row of the kernel can be read in one load operation, and the two texels on the neighboring row are a fixed stride apart. Therefore, to read the four texels, the address of one texel needs to be computed once, and the adjacent texel in the same row can be read in the same memory load operation. Similarly, the remaining two texels are a stride apart from the first two, and can thus be read using only one additional memory load operation.

Figure 3:
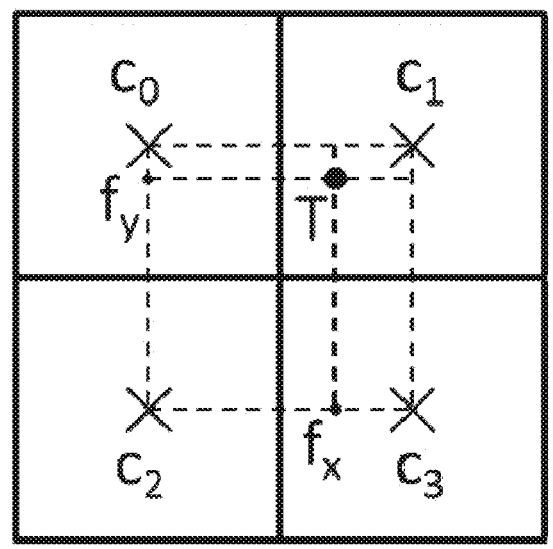
FIG. 3 illustrates an example of bilinear sampling at a sampling position T.

In the present embodiments, once the coordinates of a sampling point are known, a filter kernel K is set which includes the closest four texels to the sampling point, two of which are from the replicated texels added at the edge. Bilinear filtering may then be applied to the filter kernel K using the method shown in FIG. 3. FIG. 3 illustrates an example of bilinear sampling at a sampling position T. This method includes setting a 2×2 filter kernel including four texels $c_0$-$c_3$ that are the closest to the location specified by the sampling coordinates of the sampling point T. These four texels contribute linearly to the filtered value according to their vicinity to the sampling coordinates, in each dimension separately. The filtered result 'c' for position T may be computed using the following equation in which fractions $f_x$ and $f_y$ are the horizontal and vertical distances of T from the center of $c_2$, respectively:

$$c = c_1 * f_x * f_y + c_0 * (1-f_x) * f_y + c_2 * (1-f_x) * (1-f_y) + c_3 * f_x * (1-f_y)$$

Equivalent equations can be obtained by numbering the texels differently or using the fractional distance of T relative to another texel center. Note that T can also be the adjusted texture sampling position obtained from applying the addressing mode formulas. We may call this the sampling locus L in other figures.

Which edges require a border depends on which texel of the sampling kernel is considered the 'primary' texel. The primary texel is the texel that will always be sampled from inside the principal texture data array. For instance if the top left texel of the 2×2 kernel is considered the primary one, then the texture requires at least a border on the right and bottom edge.

In an embodiment, it is possible to use the same data layout to implement other addressing modes than wrapping. For example, the clamping mode is implemented by clamping the texture coordinates to the range determined by the centers of the edge texels in the principal texture. This ensures that even though the bilinear filter kernel may read the border texels, they do not contribute to the filtered result. The mirror-once addressing mode is implemented by first taking the absolute value of the texture sampling coordinates, and then clamping them in the same way as for the clamping mode. Mirroring (indefinitely) is implemented using the triangle wave function with period 2, range [0, 1] and intersecting the origin, which is subsequently again clamped to the range of the first and last texel center in each respective dimension. In summary the following formulas are applied to the texture coordinates, resulting in a new 'locus' used for the actual sampling:

wrap mode: $x' = x - \text{floor}(x)$ clamp mode: $x' = \text{clamp}(x, \text{first-texel-center}, \text{last-texel-center})$ mirror-once: $x' = \text{clamp}(abs(x), \text{first-texel-center}, \text{last-texel-center})$ mirror: $x' = \text{clamp}(abs(2*(x/2 - \text{floor}(x/2 + \frac{1}{2}))), \text{first-texel-center}, \text{last-texel-center})$ In the above formulas x is a given sampling coordinate, and x' is the resulting coordinate for the new sampling locus.

It is to be noted that these formulas use normalized texture coordinates, but they can also be adjusted for unnormalized coordinates. Furthermore, other mathematically equivalent formulas can be used to obtain the same curves. Small 'epsilon' values may be added or subtracted from the texels center coordinates before being used in these formulas, to account for rounding rules which result in reading only the intended texels within the principal texture and the borders.

In another embodiment, it is possible to use the same concept of texture borders to facilitate bilinear filtering of cube textures. It requires adding a border around each edge of the principal texture. But instead of replicating texels from the same two-dimensional principal texture for each face, the texel data for the border is copied from the adjoining edges in geometrically neighboring faces. The corner border texel stores the average value(s) of the corner texels of the principal data of the neighboring faces (per texel component). This allows seamless bilinear filtering of cube textures while only having to sample from one cube face. Again all of the texels required for the bilinear filtering kernel are a predeterminable stride apart instead of depending on the sampling coordinates.

Figure 4:
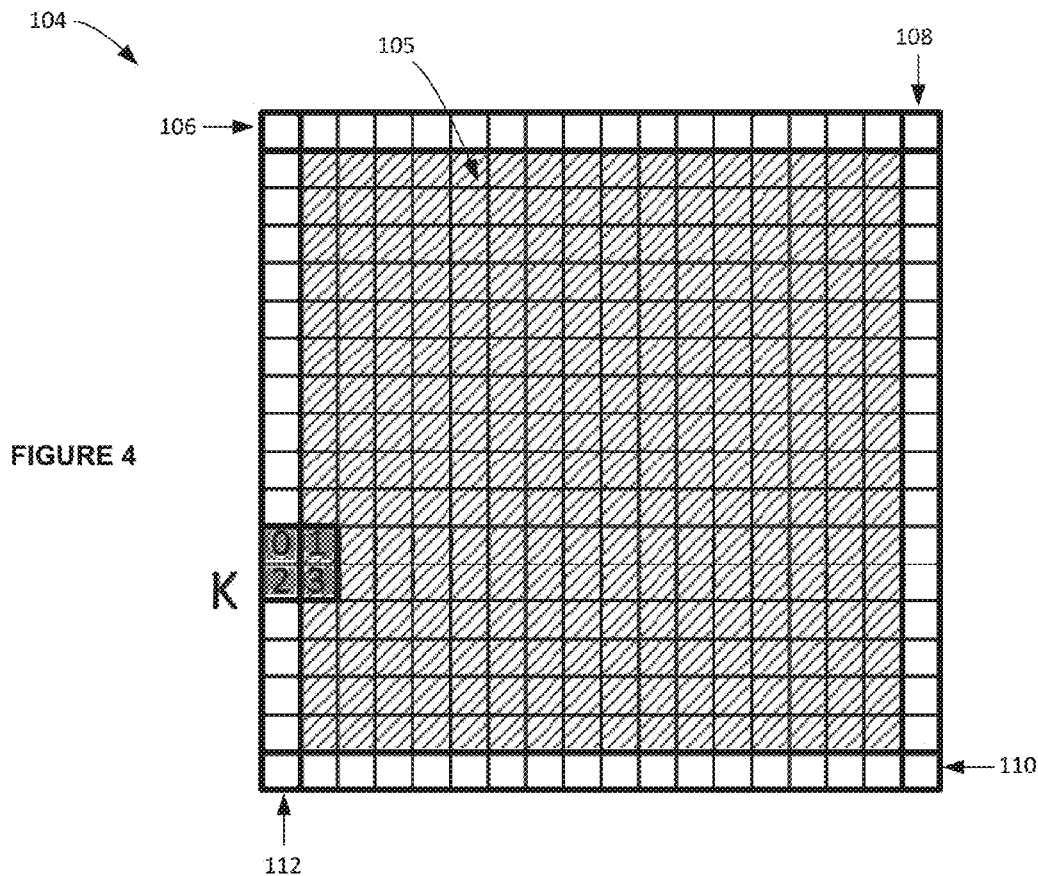
FIG. 4 illustrates the layout of texture data of one face of a cube map texture, in accordance with an embodiment.
Figure 5:
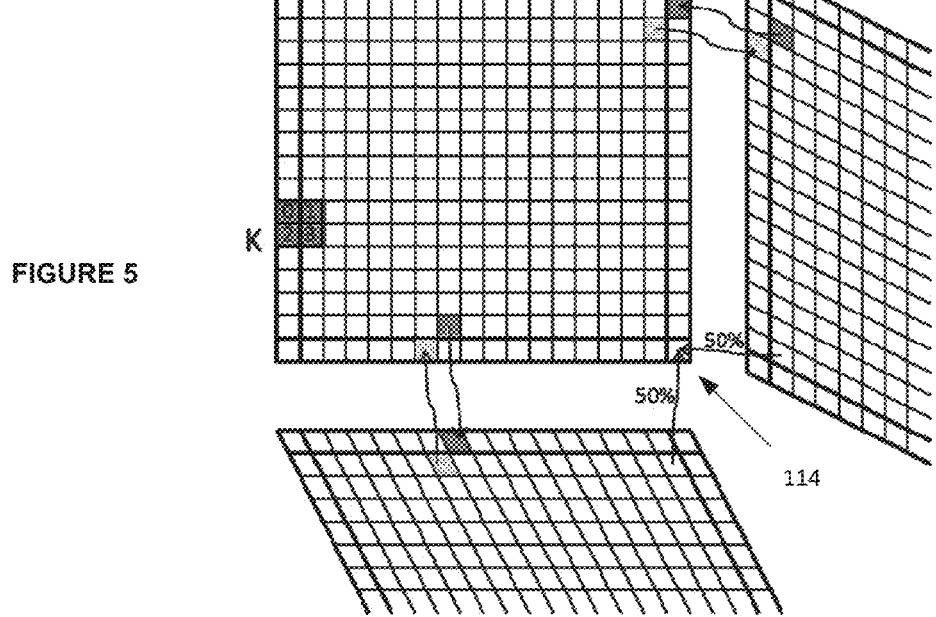
FIG. 5 illustrates an exemplary representation of three faces of a cube texture with additional borders (two of which are only partially shown)

FIG. 4 illustrates the layout of texture data of one face of a cube map texture, in accordance with an embodiment. As illustrated in FIG. 4, the layout 104 includes additional rows and columns 106, 108, 110, and 112 that were added to the original layout 105 which includes the principal data. Each added column/row includes the texels of the adjacent/corresponding column/row border of the adjacent cube face as exemplified in FIG. 5. FIG. 5 illustrates an exemplary representation of three faces of a cube texture with additional borders (two of which are only partially shown). In this example, the corner texel of the border is the averaged value of the corner texels of the principal data of the neighboring faces as illustrated at 114. It illustrates part of the 'simple' algorithm for filling in the border texels. Note that in FIGS. 4 & 5, the primary texel of the kernel K indicated by 0, can be a border texel.

Cube textures do not need an addressing mode formula to potentially alter the effective sampling locus as is the case for two-dimensional textures. The sampling locus corresponds to the projected coordinates for the cube face which is determined to intersect the texture sampling vector, as known in the art. The sampling coordinates therefore never lie outside of the range of the face that is sampled from. However note that the locus can be arbitrarily close to any edge and the four closest texels which constitute the bilinear filtering kernel can exceed the principal texture on either edge. Therefore unlike with two-dimensional sampling, in the case of cube texture sampling the texel of the kernel which is chosen to be the primary texel can correspond to a border texel, and thus borders are required around each edge for the presented fast bilinear sampling method.

The border texels of a cube texture can also be filled with any other values that offer a result where the edges of the cube are less perceivable due to bilinear filtering. When considering the bilinear filtering kernel as the projection of a four-sided beam originating from the center of the cube, then the projection of that same beam onto the neighboring face when sampling at the edge of the cube, is not a straight angled rectangle enclosing the two texels that are copied into the border when using the 'simple' algorithm presented above. Hence in a more advanced embodiment the values in the borders of a cube texture more accurately represent the filtered result of the projected area in the other face(s) they represent.

Although lessening the appearance of cube texture seams around the edges is generally preferred, some graphics systems or applications may not expect such a feature to be implemented, or require it to be disabable. To support the legacy behavior which corresponds to the clamping addressing mode used in two-dimensional sampling, applied to the cube face being sampled from, the borders can be made to contain texel values which repeat the texel values at the edges. Alternatively the sampling locus does have to be clamped to the range determined by the centers of the edge texels.

In some graphics systems it is unknown or hard to track whether a two-dimensional texture is either only used for two-dimensional sampling or can also be or become one of the faces of a cube texture and be sampled using three-dimensional texture coordinates. In particular some graphics APIs allow a selection of six two-dimensional textures to be interpreted as a cube texture. For these two-dimensional textures that may later be used as cube faces, it is prudent to allocate memory for borders around each edge. Even if it is never used for cube sampling, the additional row and column of texels typically does not consume much memory, and avoids having to reallocate and copy over all data if too few border edges were present for cube sampling.

Figure 6:
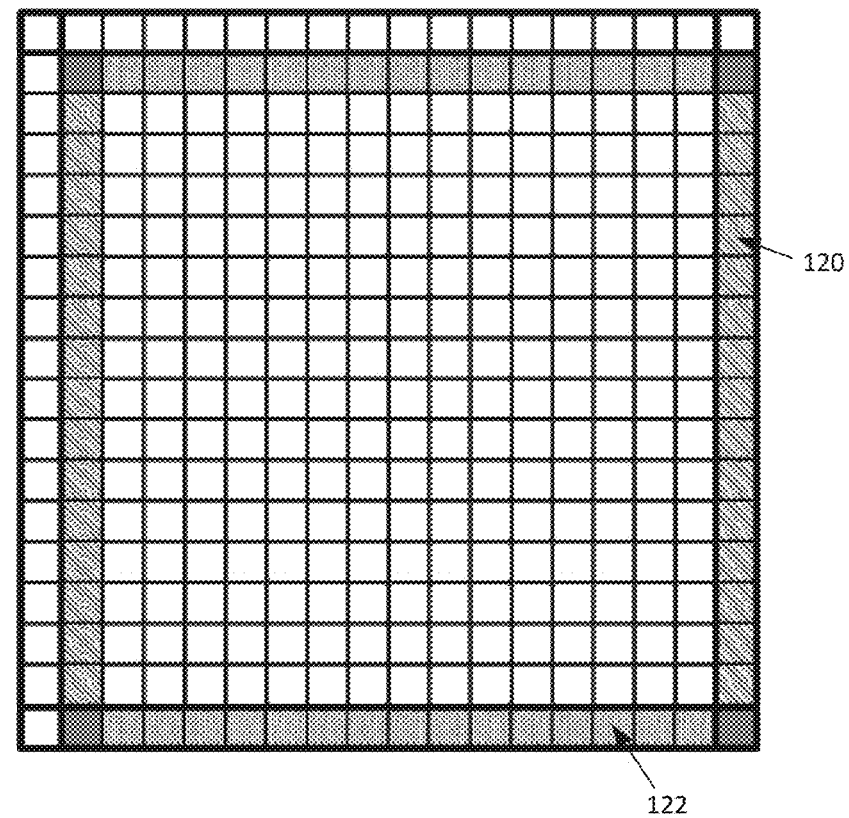
FIG. 6 illustrates a 16×16 two-dimensional texture with a border around each edge, in accordance with an embodiment.

FIG. 6 illustrates a 16×16 two-dimensional texture with a border around each edge, in accordance with an embodiment. It can therefore be suitable as a cube texture face. In the example of FIG. 6, the right border 120 and the bottom border 122 of the layout 118 have been filled with 'wrapped' texels from the principal texture data to be used for faster two-dimensional bilinear texture sampling instead. This illustrates that designating a texture for two-dimensional sampling or as a face of a cube texture can happen after allocating its memory, as long as sufficient space is reserved for a border around each edge. Note that it can still be used as a cube texture face as well as long as the bilinear filtering code for this case explicitly applies the addressing mode to each kernel texel and thus accesses only principal data (possibly from other faces). A padding zone to the far right has been omitted from this illustration but could be present in an equivalent memory layout.

In another embodiment, the faces of cube textures which are known not to be used for two-dimensional sampling can be allocated in such a way that some of the borders can be eliminated. By placing the principal data of faces that share an edge next to each other, either horizontally or vertically with respect to which edge is shared, they each have a row or column of principal texels which can act as the border for the other face. These texels already hold the values that the 'simple' border filling algorithm would otherwise have to copy explicitly. Hence this approach saves both the additional memory for some border texels, and the time to fill them. Note that this approach also eliminates certain edge texels of the border.

In cases where previously the corner border texel would be read, a texel from the other face's border will be read instead. And instead of having the average value of the two neighboring face's primary corner texels, it stores the corner texel value of just the third neighboring face. This results in that texel value having additional weight in the bilinear filtering. However, the 'simple' algorithm was already a compromise for how the three texels at a cube corner affect the filtering result unevenly. Most graphics APIs allow for a different compromise, thus making the elimination of neighboring border edges and corners in this fashion a worthwhile technique. Again alternative 'filtered' values could be used in the remaining borders, but the eliminated borders are forced to use implicit values corresponding to the 'simple' algorithm.

Figure 7:
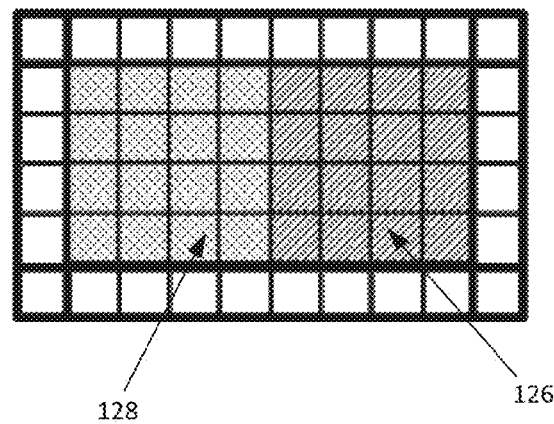
FIG. 7 illustrates a possible memory layout 124 for two neighboring 4×4 faces of a cube texture.

FIG. 7 illustrates a possible memory layout 124 for two neighboring 4×4 faces of a cube texture. The principal data of each cube face is indicated with two different patterns 126 and 128. In the present example, there is no explicit border to the right of the left principal texture data, and no border to the left of the right principal data. However, the sampling kernel can safely read from the column of texels just right of the left principal data or left of the right principal data, which act as an implicit border for each face respectively. No updating of this implicit border is required, and the actual illustrated border can be filled with (filtered) values originating from the other faces to obtain practically imperceivable edges between faces. More borders can be shared/eliminated than illustrated here, and there could be an additional padding zone to the right.

It is to be noted that when the principal texture data changes, the borders may require updating. In an embodiment, a gatekeeper is used to control read and write access to the texture data. When write access is requested for a region which includes edge texels of the principal texture, the corresponding texels in the border are flagged as 'dirty' so that on the next read access request for bilinear filtering they can be updated with the new data. The updating can also be done conservatively at a coarser granularity by tracking the dirty state for subsections of the border or the entire border, and/or by considering the request for write access to a smaller region or an unspecified region to require a border update.

The gatekeeper may also need to be informed of the type of texture sampling that will be performed, so that the border can be updated appropriately for two-dimensional or cube sampling. When a two-dimensional texture can be used both for two-dimensional sampling and as a face of a cube texture simultaneously, the texture data has to be duplicated and each copy requires different border updates. This approach also requires keeping track of which copy received new principal data the last so the other one can have its principal data and border updated appropriately as well. In an alternative embodiment a fixed type of border and associated update algorithm is chosen per texture, for instance based on the first sample access request. The gatekeeper informs the sampler code of the type of border that is present so that it can select between a bilinear filtering implementation which does or does not require the ability to split up the filter kernel. This way there are no additional copies to be managed while still optimising bilinear filtering for one kind of sampling which is deemed to be used most frequently.

Those skilled in the art will observe that some of the methods presented above can also be applied to one-dimensional and three-dimensional textures in a straightforward manner. One-dimensional textures require only filtering two texels in a linear fashion. The minimal border thus consists of a single extra texel. Three-dimensional texture filtering can be implemented by representing the texture as multiple layers of two-dimensional textures and linearly filtering in the third dimension two bilinearly filtered samples which used the first two texture coordinates.

It is advantageous for the stride to be a power of two. This allows for computing the linear address of a texel using a shift operation instead of a multiplication, which is typically faster, and consumes less energy. However, when adding borders to a texture with power-of-two dimensions, the 'natural' stride (i.e. without padding) can go from being a power-of-two value to another value that is no longer a power-of-two. The amount of padding required to make it a power of two again can be almost as large as the texture data itself. In an embodiment, the padding zone created by making the stride a power of two, may be used for storing other texture data. For instance many textures have multiple 'mipmap' levels which are used in the art for reducing aliasing during minification. Mipmaps consist of pre-filtered scaled down versions of the original texture. They can themselves be considered textures and the original full resolution texture forms the top level of the mipmap. Because the lower levels of the mipmap are smaller, some or all of them can fit in the padding zone of the top level. These levels would all share the same stride for accessing the texel on their next row, despite having different dimensions.

Figure 8:
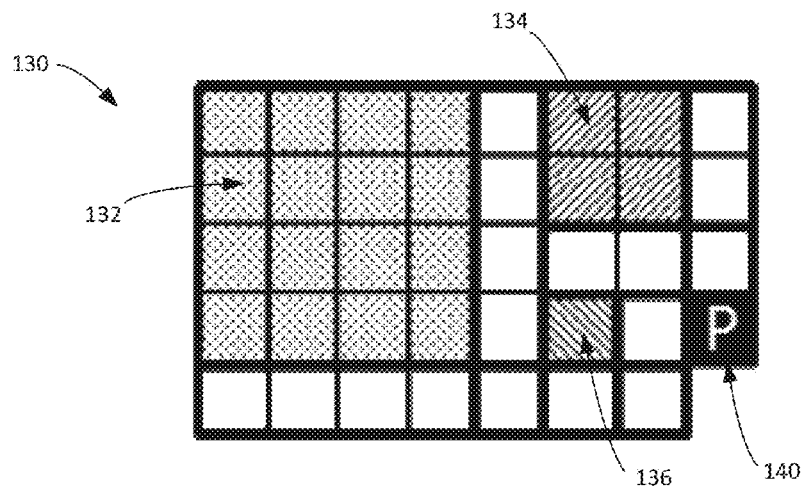
FIG. 8 illustrates an exemplary layout showing the packing together of three mipmap levels of a 4×4 texture to obtain a power-of-two stride of 8 texels wide with minimal wasted memory space, in accordance with an embodiment.

FIG. 8 illustrates an exemplary layout showing the packing together of three mipmap levels of a 4×4 texture to obtain a power-of-two stride of 8 texels wide with minimal wasted memory space, in accordance with an embodiment. The patterned areas 132, 134, and 136 represent the principal data of the 4×4, 2×2 and 1×1 mipmap levels, respectively, and they each have borders to the right and bottom and a corner border texel. The black texel 138 marked P is a padding texel. Below it there is another unused padding texel that could have been situated but it does not have to be allocated because it is not required for holding principal data or border data or to align the next row of texels to the stride because there is no next row.

Many variants of 'packing' algorithms can be used for reducing the amount of padding that does not contain any useful data, in accordance with an embodiment. It can even pack mipmap levels of different textures. The stride also does not have to be the smallest power of two that allows to fit the top level texture row size (for row-major textures) plus the respective border texels. It can be made larger to make more room for other texture mipmap levels. For instance a 6×6 texture could have a size of 7×7 with borders, but having a stride of 8 texel sizes doesn't fit much if anything else in the padding area. A stride of 16 texel sizes would allow it to fit all the mipmap levels and possibly some or all of the mipmap levels of some other textures. Having all mipmap levels of a texture share the same stride has the advantage that only one stride value has to be stored and accessed. In particular for tri-linear filtering it would otherwise require accessing two stride values. One may also choose the stride to fit at least the largest texture supported by the graphics system. This way the stride is a constant and could be encoded as part of the sampling code instead of having to store it as metadata of the texture.

Making the stride larger can have an adverse effect on a processor's cache performance. Automatic hardware pre-fetching typically has a limit on the access stride size for which it can detect a predictable pattern. The present embodiments address this problem by issuing software pre-fetch instructions for locations around the filter kernel. Alternatively or additionally, it is possible to record the sampling coordinates or addresses and use them to predict future coordinates or addresses at the next occasion the same texture is sampled (or the same logical sampler unit is used), before overwriting them with the new coordinates or addresses. The predicted values would then be used by pre-fetch instructions.

Another way to improve cache performance is to divide the texture into rectangular tiles and add borders to each tile which, when they have a neighboring tile in the texture contain the corresponding texel values from those tiles, and when they don't have a neighboring tile contain wrapped around texel values or texel values to avoid the appearance of seams in the case of a cube texture as presented earlier. This approach allows each tile to have a smaller stride for accessing texels in the next row, suitable for the processor to use automatic hardware pre-fetching. The texels of the tiles (including the border texels) are stored sequentially in memory, with possibly some padding in between each row (again assuming a row-major layout).

The tiles can be stored sequentially in either a row-major or column-major order, with or without padding, or they can be stored using any other sufficiently easy to compute order which improves their locality, such as for example Morton order. Once the corresponding tile is determined for a sampling locus, bilinear filtering can be performed without requiring addressing and loading each texel for the kernel individually, as detailed before. Also similarly as before the padding within each tile can be used to have power-of-two strides and the padding space can be recycled to store other mipmap levels or textures. Padding can also exist between tiles to facilitate calculating in which tile a sampling locus is situated and where it is stored in memory, which can be used for storing additional tiles. For instance Morton order requires a power-of-two number of tiles in each direction.

Figure 9:
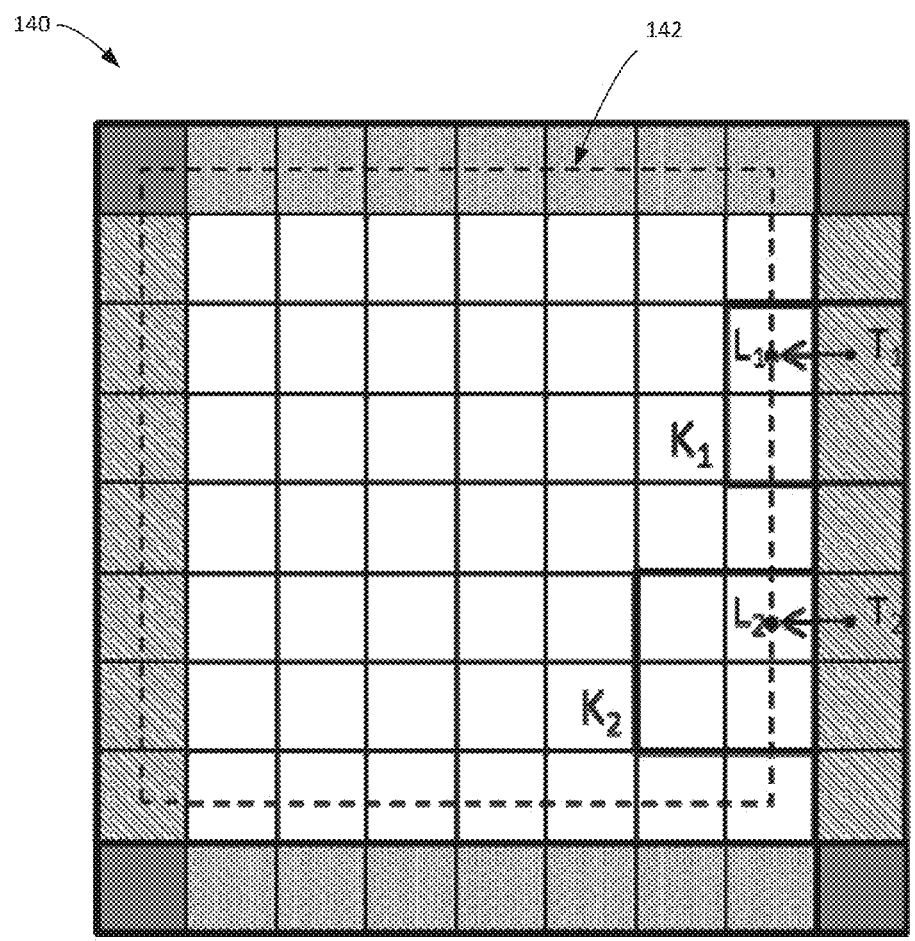
FIG. 9 illustrates an exemplary implementation of the clamp addressing mode, in accordance with an embodiment.

FIG. 9 illustrates an exemplary implementation of the clamp addressing mode, in accordance with an embodiment. The layout 140 shown in FIG. 9 uses an 8×8 texture with borders at the right and bottom. The dashed lines 142 intersect the centers of the first and last rows and columns of the principal texture. In an embodiment, the texture sampling at a given position T is clamped to be on or just inside the area delimited by the dashed lines, and results in a sampling locus L. If one or more locus coordinates are at the center of a texel, it is arbitrary which equidistant texels will also be part of the bilinear kernel K, as long as consistent rules are used to result in reading texels in a 2×2 arrangement suitable for bilinear filtering and not reading texels logically outside of the principal texture and the borders. Examples are provided below.

For example the position T1 and its corresponding locus L1 and bilinear kernel K1 illustrate an example in which the chosen rules result in reading texels of the border. Note that even though these texel borders contain values from the opposing edge of the principal texture and thus correspond to a wrapping mode instead of a clamping mode, they do not contribute to the filtered result because the fractions used in the bilinear filtering make their weight zero.

For example the position T2 and its corresponding locus L2 and bilinear kernel K2 illustrate another example in which the chosen rules result in not reading border texels. This can be achieved either by adjusting the clamping range with epsilon values, or by adhering to different rounding rules than the first example. Care is required to ensure that at the opposite edge the same rounding rules do not result in reading texels which are logically outside of the texture and border. This can be avoided for example by using an epsilon value for the clamping value at that edge, or by adding a border at that edge. The use of epsilon values may or may not result in a minor contribution to the filtered result of texel values not on the edge when sampling at the edge. This can be avoided by making the epsilon value smaller than the precision or half the precision at which the bilinear filtering is performed, adjusted for the size of the texture in case of normalized sampling coordinates.

The need for borders may be eliminated altogether with the use of epsilon values, if the texture will only be sampled with addressing modes that require a clamp operation.

The addressing mode for each coordinate of the texture sampling position may differ. Other addressing mode formulas which use the clamp( ) operation work similarly, but T may first undergo another transformation before the clamping is performed. There may also be subsequent transformations, if this results in an equivalent formula which implements the requested addressing mode.

In the above, the embodiments are described with respect to a single texture sampling operation as if the single texture sampling operation is executed individually. However, in practice many of these operations may be executed in parallel and/or concurrently, using for example SIMD, SMT and/or multi-core technology. The two load operations to obtain all the data for the bilinear kernel can be part of two 'gather' instructions, which is the SIMD equivalent of a load operation, for multiple kernels in parallel. Alternatively the two load operations can both be part of a single gather instruction. Note that the processor may internally split up gather operations into multiple load operations, and even a logical scalar load operation may be split into multiple parts and be reassembled if it straddles a cache line boundary or multiple ways or banks. These are hardware implementation details, but it is important to note that even though gather instructions can do multiple load operations in parallel and could thus be used to load each texel of a bilinear kernel as a separate element and yet in parallel, it is beneficial to use gather instructions where each element contains two texels and they are unlikely to require split load operations internally.

Figure 10:
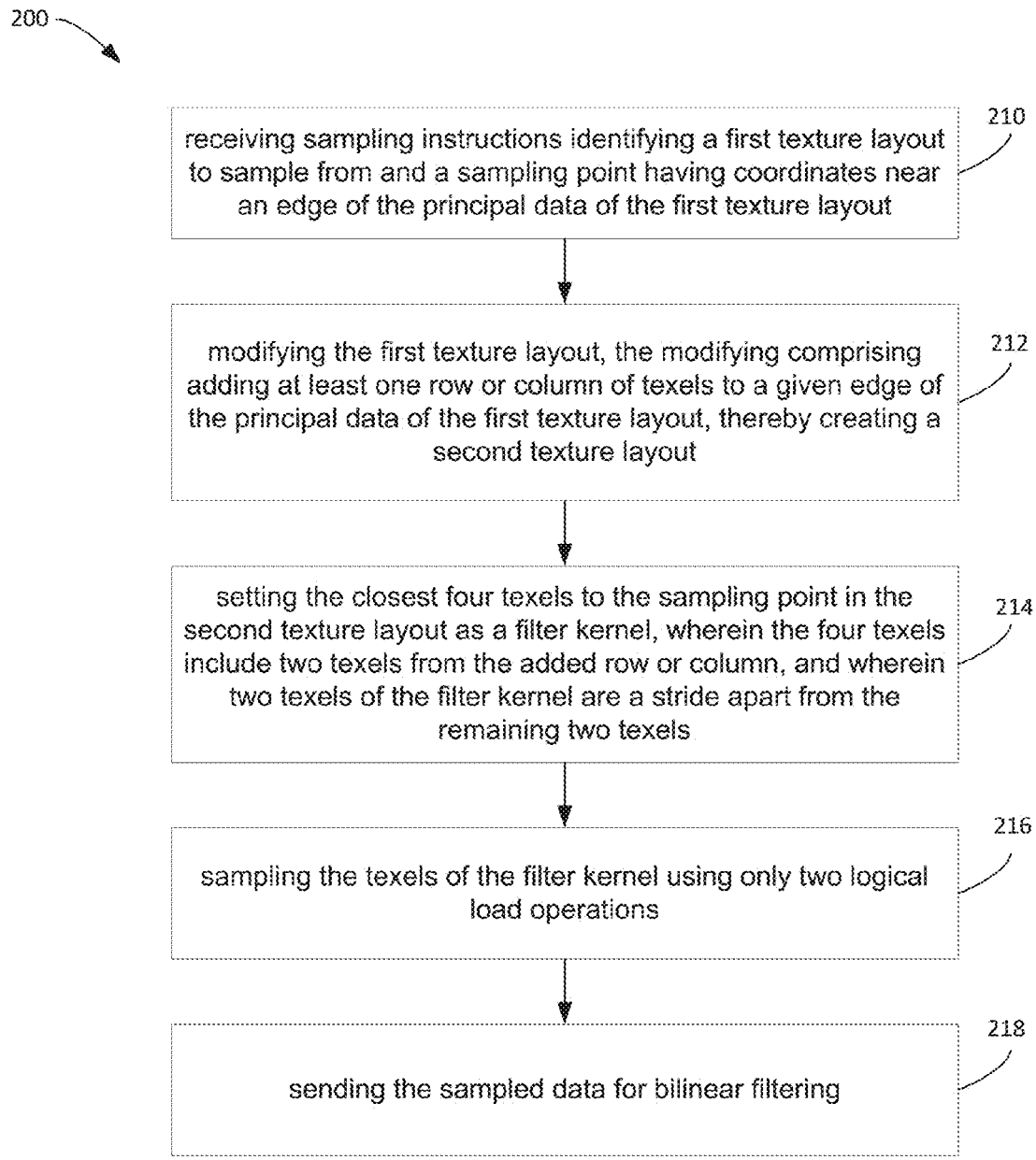
FIG. 10 is flowchart of a method for expediting bilinear texture sampling of two-dimensional texture layouts, in accordance with an embodiment.

FIG. 10 is flowchart of a method for expediting bilinear texture sampling of two-dimensional texture layouts, in accordance with an embodiment. As shown in FIG. 10 the method 200 begins at step 210 by receiving sampling instructions identifying a first texture layout to sample from and a sampling point having coordinates near an edge of the principal data of the first texture layout. Step 212 comprises modifying the first texture layout, the modifying comprising adding at least one row or column of texels to a given edge of the principal data of the first texture layout, thereby creating a second texture layout. Step 214 comprises setting the closest four texels to the sampling point in the second texture layout as a filter kernel, wherein the four texels include two texels from the added row or column, and wherein two texels of the filter kernel are a stride apart from the remaining two texels. Step 216 comprises sampling the texels of the filter kernel using only two logical load operations. Step 218 comprises sending the sampled data for bilinear filtering.

Figure 11:
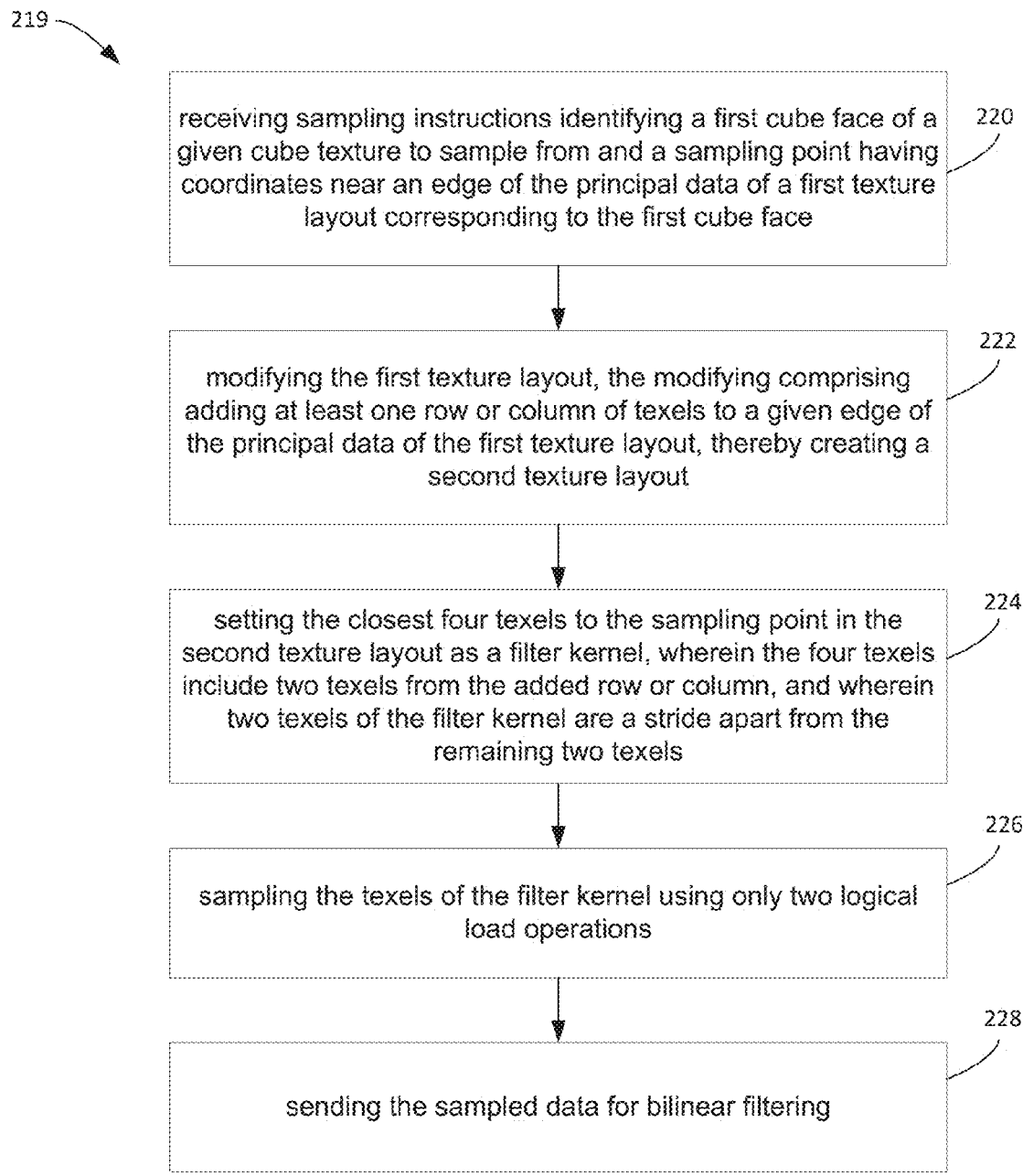
FIG. 11 is flowchart of a method for expediting bilinear texture sampling of cube textures, in accordance with an embodiment.

FIG. 11 is flowchart of a method for expediting bilinear texture sampling of cube textures, in accordance with an embodiment. As shown in FIG. 11, the method 219 begins at step 220 by receiving sampling instructions identifying a first cube face of a given cube texture to sample from and a sampling point having coordinates near an edge of the principal data of a first texture layout corresponding to the first cube face. Step 22 comprises modifying the first texture layout, the modifying comprising adding at least one row or column of texels to a given edge of the principal data of the first texture layout, thereby creating a second texture layout. Step 224 comprises setting the closest four texels to the sampling point in the second texture layout as a filter kernel, wherein the four texels include two texels from the added row or column, and wherein two texels of the filter kernel are a stride apart from the remaining two texels. Step 226 comprises sampling the texels of the filter kernel using only two logical load operations. Step 228 comprises sending the sampled data for bilinear filtering.

Computing Environment

Figure 12:
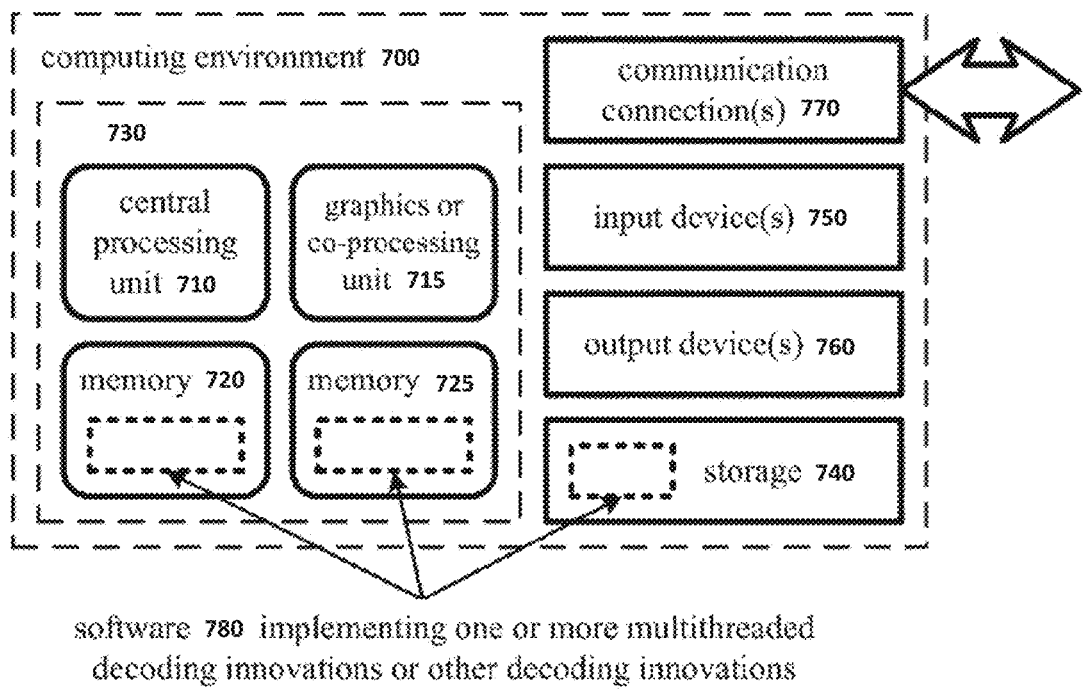
FIG. 12 illustrates a generalized example of a suitable computing environment in which several of the described embodiments may be implemented.

FIG. 12 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 12, the computing environment 700 includes at least one CPU 710 and associated memory 720 and optionally at least one GPU or other co-processing unit 715 and associated memory 725 used for video acceleration. In FIG. 12, this most basic configuration 730 is included within a dashed line. The processing unit 710 executes computer-executable instructions and may be a real or a virtual processor. In a multi-processing system, multiple processing units execute computer-executable instructions to increase processing power. A host encoder or decoder process offloads certain computationally intensive operations to the GPU 715. The memory 720, 125 may be volatile memory (e.g., registers, cache, RAM), non-volatile memory (e.g., ROM, EEPROM, flash memory, etc.), or some combination of the two. The memory 720, 125 stores software 780 for a decoder implementing one or more of the decoder innovations described herein.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780.

The input device(s) 750 may be a touch input device such as a keyboard, mouse, pen, or trackball, a voice input device, a scanning device, or another device that provides input to the computing environment 700. For audio or video encoding, the input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computing system for expediting bilinear texture sampling of texture layouts comprising principal data including one or more rows and one or more columns of texels, the system comprising:
   a memory;
   a processing unit operably connected to the memory, the processing unit being adapted to:
      receive sampling instructions identifying a first texture layout to sample from and a sampling point having coordinates near an edge of the principal data of the first texture layout;
      modify the first texture layout, including adding at least one row or column of texels to a given edge of the principal data of the first texture layout, thereby creating a second texture layout;
      set the closest four texels to the sampling point in the second texture layout as a filter kernel, wherein the four texels include two texels from the added row or column, and wherein two texels of the filter kernel are a stride apart from the remaining two texels;
      sample the texels of the filter kernel using only two logical load operations; and
      perform bilinear filtering on the sampled data of the four texels wherein the added row or column includes duplicate texels from an opposite edge of the principal data.

2. The computing system of claim 1, wherein the first texture layout a two-dimensional image layout.

3. The computing system of claim 1, wherein the first texture layout is a cube face layout of a cube texture.

4. The computing system of claim 1, wherein the system is adapted to add rows or columns including texels of different mipmap levels for making the stride a power of two.

5. A computer implemented method for expediting bilinear texture sampling of two-dimensional texture layouts comprising principal data including one or more rows and one or more columns of texels, said method comprising:
   receiving sampling instructions identifying a first texture layout to sample from and a sampling point having coordinates near an edge of the principal data of the first texture layout;
   modifying the first texture layout, the modifying comprising adding at least one row or column of texels to a given edge of the principal data of the first texture layout, thereby creating a second texture layout;
   setting the closest four texels to the sampling point in the second texture layout as a filter kernel, wherein the four texels include two texels from the added row or column, and wherein two texels of the filter kernel are a stride apart from the remaining two texels;
   sampling the texels of the filter kernel using only two logical load operations; and
   sending the sampled data for bilinear filtering;

wherein the modifying comprises filling the added row or column with one of: duplicate texels of an opposite edge of the principal data and texels of different mipmap levels.

6. The method of claim 5, wherein the modifying further comprises making the stride a power of two.

7. The method of claim 5, further comprising:
implementing a gatekeeper for updating the texels in the added row or column when texels of principal data change.

8. The method of claim 5, further comprising: issuing pre-fetch instructions for locations around the filter kernel to reduce an effect of a larger stride on a processor's cache performance.

9. A computer implemented method for expediting bilinear texture sampling of cube textures comprising adjacent cube faces, each cube face having a texture layout including principal data comprising one or more rows and one or more columns of texels, said method comprising:
receiving sampling instructions identifying a first cube face of a given cube texture to sample from and a sampling point having coordinates near an edge of the principal data of a first texture layout corresponding to the first cube face;
modifying the first texture layout, the modifying comprising adding at least one row or column of texels to a given edge of the principal data of the first texture layout, thereby creating a second texture layout;
setting the closest four texels to the sampling point in the second texture layout as a filter kernel, wherein the four texels include two texels from the added row or column, and wherein two texels of the filter kernel are a stride apart from the remaining two texels;
sampling the texels of the filter kernel using only two logical load operations;
sending the sampled data for bilinear filtering; and
implementing a gatekeeper for updating the texels in the added row or column when texels of principal data change.

10. The method of claim 9, wherein the modifying comprises filling the added row or column with duplicate texels of an adjacent row or column of an adjacent cube face.

11. The method of claim 9, wherein modifying the first texture layout comprises adding an entire texture layout of a neighboring cube face to a corresponding edge of the first texture layout.

12. The method of claim 9, wherein the modifying comprises adding one row and one column of texels to the principal data, and setting a corresponding corner texel between the added row and added column as an average value of corner texels of principal data of neighboring cube faces.

13. The method of claim 9, further comprising: issuing pre-fetch instructions for locations around the filter kernel to reduce an effect of a larger stride on a processor's cache performance.

14. The method of claim 9, wherein the modifying comprises filling the added row or column with texels of different mipmap levels.

15. The method of claim 14, wherein the modifying further comprises making the stride a power of two.

16. A computing system for expediting bilinear texture sampling of texture layouts comprising principal data including one or more rows and one or more columns of texels, the system comprising:
a memory;
a processing unit operably connected to the memory, the processing unit being adapted to:
receive sampling instructions identifying a first texture layout to sample from and a sampling point having coordinates near an edge of the principal data of the first texture layout;
modify the first texture layout, including adding at least one row or column of texels to a given edge of the principal data of the first texture layout, thereby creating a second texture layout;
set the closest four texels to the sampling point in the second texture layout as a filter kernel, wherein the four texels include two texels from the added row or column, and wherein two texels of the filter kernel are a stride apart from the remaining two texels;
sample the texels of the filter kernel using only two logical load operations; and
perform bilinear filtering on the sampled data of the four texels;
wherein the system is adapted to add rows or columns including texels of different mipmap levels for making the stride a power of two.

* * * * *